United States Patent [19]
Nishida

[11] Patent Number: 4,979,599
[45] Date of Patent: Dec. 25, 1990

[54] WORK VEHICLE

[75] Inventor: Tetsuya Nishida, Sakai, Japan

[73] Assignee: Kubota, Ltd., Osaka, Japan

[21] Appl. No.: 307,705

[22] Filed: Feb. 8, 1989

[30] Foreign Application Priority Data

Feb. 9, 1988 [JP] Japan .................................. 63-28147
May 9, 1988 [JP] Japan ................................ 63-112161
May 10, 1988 [JP] Japan ................................ 63-114432

[51] Int. Cl.⁵ ........................ F16D 43/22; B60K 41/22
[52] U.S. Cl. ................................ 192/0.032; 192/3.58; 192/109 F
[58] Field of Search .................... 192/3.58, 3.61, 3.62, 192/3.63, 109 F, 0.032; 74/337

[56] References Cited

U.S. PATENT DOCUMENTS 4,711,329 12/1987 Hasegawa et al. .............. 192/109 F

FOREIGN PATENT DOCUMENTS 59-110923 6/1984 Japan .
61-136044 6/1986 Japan .
62-215155 9/1987 Japan .
62-231841 10/1987 Japan .

Primary Examiner—Rodney H. Bonck
Assistant Examiner—Andrea Pitts
Attorney, Agent, or Firm—Edwin E. Greigg

[57] ABSTRACT

In a work vehicle including a hydraulic clutch for a transmission system, the invention discloses an art of quickly yet shocklessly controlling the engagement of the clutch by properly judging a preliminary oil pressure condition and a half-clutched condition through a detection of torque developed in the transmission system.

13 Claims, 10 Drawing Sheets

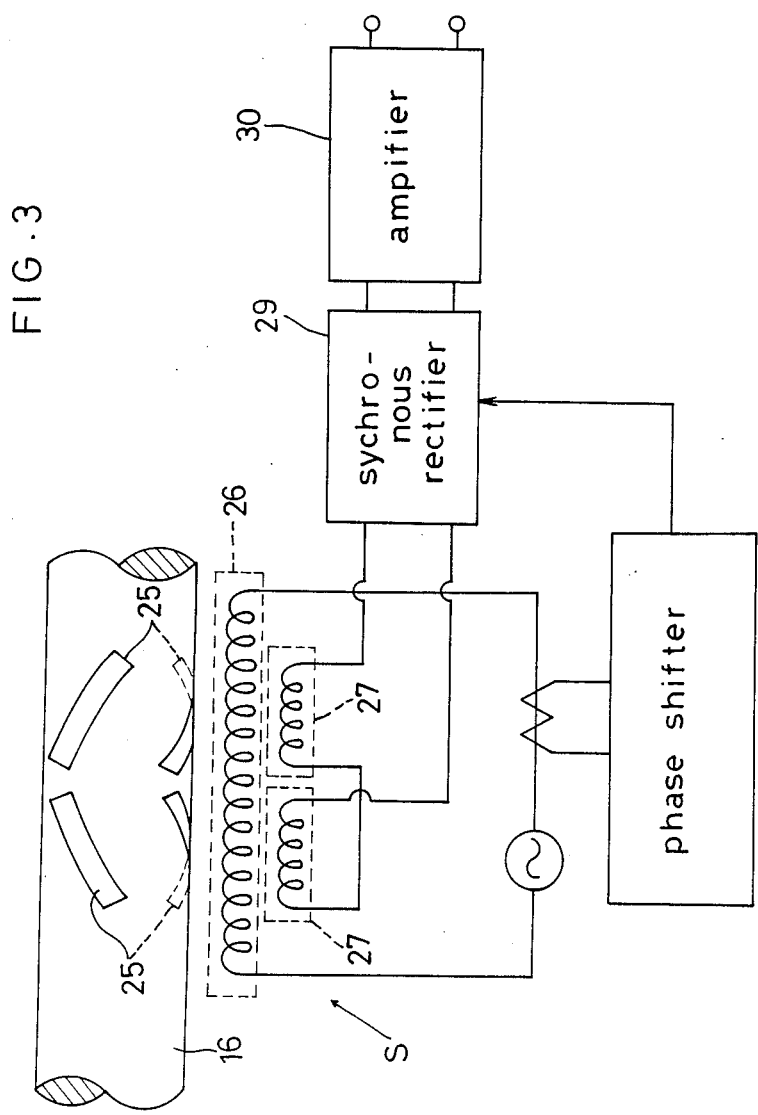

WORK VEHICLE

BACKGROUND OF THE INVENTION

1 Field of the Invention

The present invention relates to a transmission system for use in a work vehicle, and more particularly to an art of controlling a hydraulic clutch included in the transmission system.

2 Description of the Prior Art

In a work vehicle such as an agricultural tractor, the transmission system includes a gear type change-speed unit and a hydraulic clutch related to the change-speed unit. For effecting a change-speed operation, the hydraulic clutch is once disengaged. Then, the clutch is again engaged for power transmission upon completion of the change-speed operation. If this clutch engagement is effected rather hastily, this results in an operational shock adversely influencing the travelling vehicle. Reversely, if the clutch engagement is effected slowly for avoiding the shock, this results in an undesirable delay in the vehicle travelling control operation.

In view of this problem, it is known, as shock preventing means, to provide a control unit operable to adjust the amount of work oil supplied to the hydraulic clutch based on a detected value concerning a rotational velocity of the transmission system (Japanese patent laid open under Showa No. 62-215155). It is also known to provide a work vehicle body with an acceleration sensor operable to generate, when a change-speed operation is effected, an acceleration indicative signal to be fed back to a control unit of the hydraulic clutch such that the control unit adjusts the amount of oil to the clutch based on the feedback signal (Japanese patent laid open under Showa No. 62-231841). There is still further known art (no particular reference cited) in which the oil supply to the hydraulic clutch needed with a change-speed operation is adjusted in accordance with predetermined optimum oil supply characterisitcs (i.e. for most speedily engaging the clutch without causing the engagement shock).

Considering the causes of clutch engagement shock, with supply of work oil, the hydraulic clutch reaches its full-clutched condition after a half-clutched condition. An engagement shock occurs if the half-clutched condition has been maintained only for a very brief period of time or the half-clutched condition has been maintained in an unstable manner. On the other hand, for a speedy clutch engagement, clutching plates mechanically separated from each other under a disengaged condition of the clutch should come into mutual contact as quickly as possible for providing the half-clutched condition. In view of these facts, if the hydraulic clutch is controlled according to a rotational velocity of transmission system or to an acceleration rate of the travelling system as suggested by the above-described prior references, under a relatively large driving load, the transmission system cannot be driven with such half-clutched clutched condition but can be driven only with complete clutch engagement, i.e. full-clutched condition. Accordingly, in such situation, these prior methods do not function properly for avoiding the engagement shock. Moreover, if the hydraulic clutch is controlled by such predetermined, i.e. fixed characteristics, the control will fail to cope with load variations as developed when the change-speed operation is effected between various number of steps or when the vehicle encouters changes in such external factors such as a slope of travelling passage. Further, determination of such control characterisitcs per se will be difficult if they are to consider numerous factors such as oil viscosity subject to temperature variations and an amount of oil remaining at the clutch.

The primary object of the present invention is to provide a work vehicle which may constantly travel at an optimum operational condition with a smooth and speedy engagement of a hydraulic clutch regardless of possible changes in the driving load or external factors.

In order to accomplish the above-noted object, a work vehicle according to the present invention comprises: a hydraulic clutch; a torque sensor for detecting an amount of transmission torque of a travelling transmission system; a control valve for adjusting an amount of work oil to be fed to the hydraulic clutch; valve control means for controlling operations of the control valve in accordance with a predetermined control scheme designed for engaging hydraulic clutch, the control scheme including, a first step of opening the control valve to a first predetermined degree, a second step of temporarily closing the control valve to a second predetermined degree lower than the first predetermined degree and then opening the same again up to a full-open degree, and a third step of maintaining the opened condition of the control valve achieved by the second step; wherein the second step is initiated when the torque sensor has detected a rise in the transmission torque.

According to this construction, the hydraulic clutch has its oil supply amount controlled through the control valve which in turn is controlled by the valve control means. More particularly, there is provided the torque sensor to the travelling transmission system of the vehicle so as to detect a transmission torque being developed in the system. On the other hand, the valve control means effects its valve control scheme in three steps. In the first step, the control valve is opened to the first predetermined degree whereby currently separated friction (clutching) plates inside the clutch casing start contacting each other for providing a half-clutched condition. In this step, the oil is supplied quickly to the clutch through the control valve until the half-clutched condition is achieved. Then, in the second step, the control valve is temporarily closed down to the second predetermined degree so as to maintained the half-clutched condition achieved in the first step. Further in this second step, the temporarily closed control valve is again gradually opened to its maximum degree of providing a full-clutched condition. In the third step thereafter, this full-clutched condition is effectively maintained. Then, in the present invention, the shift timing between the first control step and the second control step coincides with the transmission torque rise detection made by the torque sensor. That is to say, a relatively large amount of oil is supplied to the clutch until there develops a rise in the transmission torque. Then, upon detection of torque rise; namely, upon initiation of power transmission under the half-clutched condition, the oil supply is first reduced temporarily and then increased gradually up to the maximum value corresponding to the full-open valve condition, i.e. full-clutched condition.

Accordingly, even if the vehicle driving load changes to disable effective power transmission to the travelling system, the hydraulic clutch may be speedily and shocklessly engaged through the proper detection of half-clutched condition.

Consequently, through such simple improvement including the torque sensor for the transmission system and the control scheme executed based on a detection of the torque sensor, the present invention has fully achieved the intended work vehicle which may always travel at the optimum operational condition with the speedy yet shockless engagement of the hydraulic clutch.

According to one preferred embodiment of the present invention, the re-opening operation of the control valve by the second step is executed based on a detection by the torque sensor so as to permit a transmission torque value of the travelling transmission system to follow a predetermined rising tendency. With this arrangement, the re-opening operation of the control valve in the second step is also effected based on the detection by the torque sensor. In comparison with the aforementioned rotational-velocity-based or acceleration-based control scheme of the prior art, this arrangement is advantageous for providing further improved half-clutching control in terms of engagement accuracy and speed and also power transmission efficiency. That is, this additional arrangement permits the half-clutching control to respond even more quickly to the driving load change. Accordingly, the work vehicle provided with this arrangement will benefit from further improved clutch control free from operational delay.

According to a further embodiment of the present invention, the first predetermined valve opening degree of the first step is set lower than the full-open degree maintained by the third step. If the valve were opened almost up to the maximum, i.e. full-open condition in the first step, this would deteriorate the shock-preventing effect of the temporary and partial valve closure effected in the second step by developing an unstable oil pressure condition in the clutch. In such unstable oil pressure condition, it has been experimentally learned that the clutch fails to effectively maintain the desired half-clutched condition and tends to become engaged to a degree exceeding the desired half-clutched condition thereby causing an engagement shock in spite of the temporary oil pressure reduction. For this reason, if the first predetermined valve opening degree is set lower than the full-open valve condition thereby providing a signal corresponding to a pressure close to the target pressure to be achieved by the second step, the oil pressure condition inside the clutch casing immediately after the shifting from the first to second step may be quickly stabilized thereby achieving quick and shockless clutch engagement.

BRIEF DESCRIPTION OF THE DRAWINGS

Accompanying drawings illustrate preferred embodiments of the present invention; in which, FIG. 3 is a construction view of a torque sensor, FIG. 9a is a graph showing a signal voltage to be applied to a control valve relating to the alternate embodiment, and FIG. 9b is a graph illustrating a torque rise condition corresponding to FIG. 9a.

DESCRIPTION OF THE PREFERRED EMBODIMENTS

Figure 1:
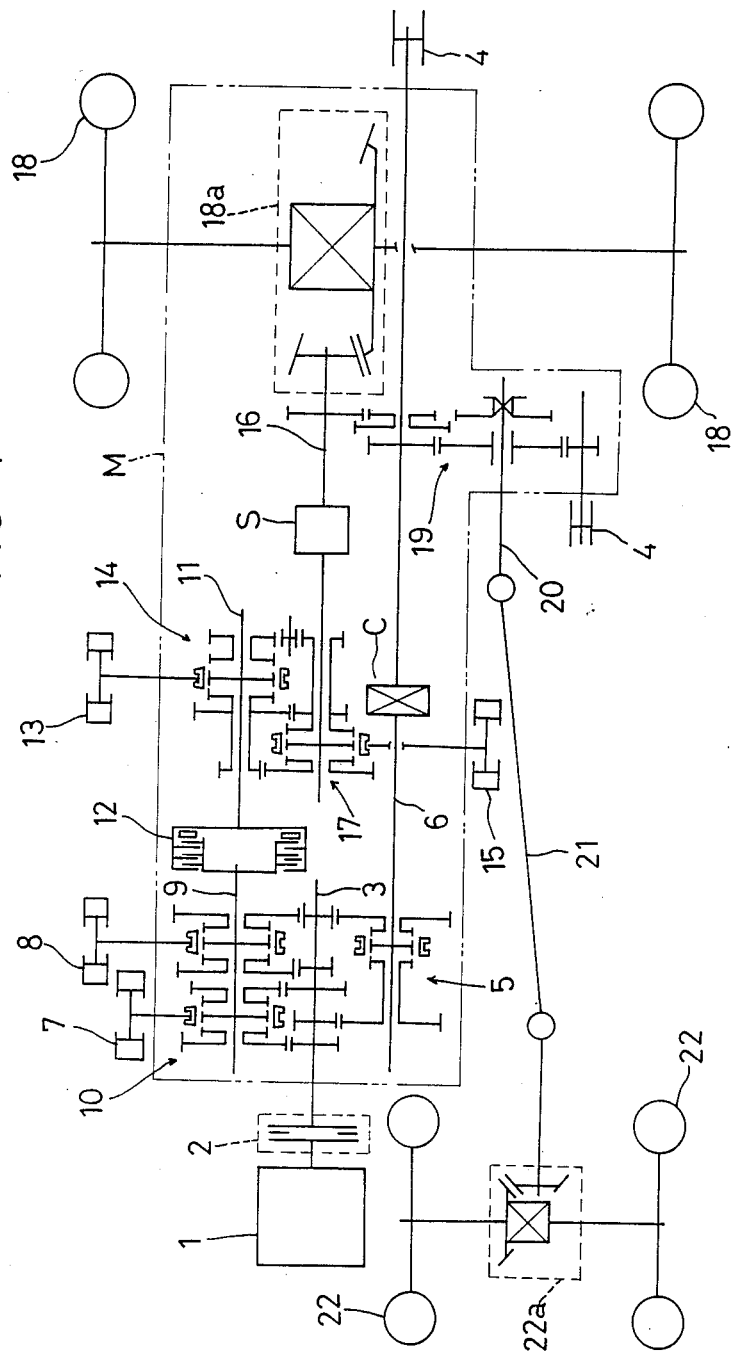
FIG. 1 is a diagram of a transmission system for use in an agricultural tractor as one example of a work vehicle to which the present invention pertains.
Figure 2:
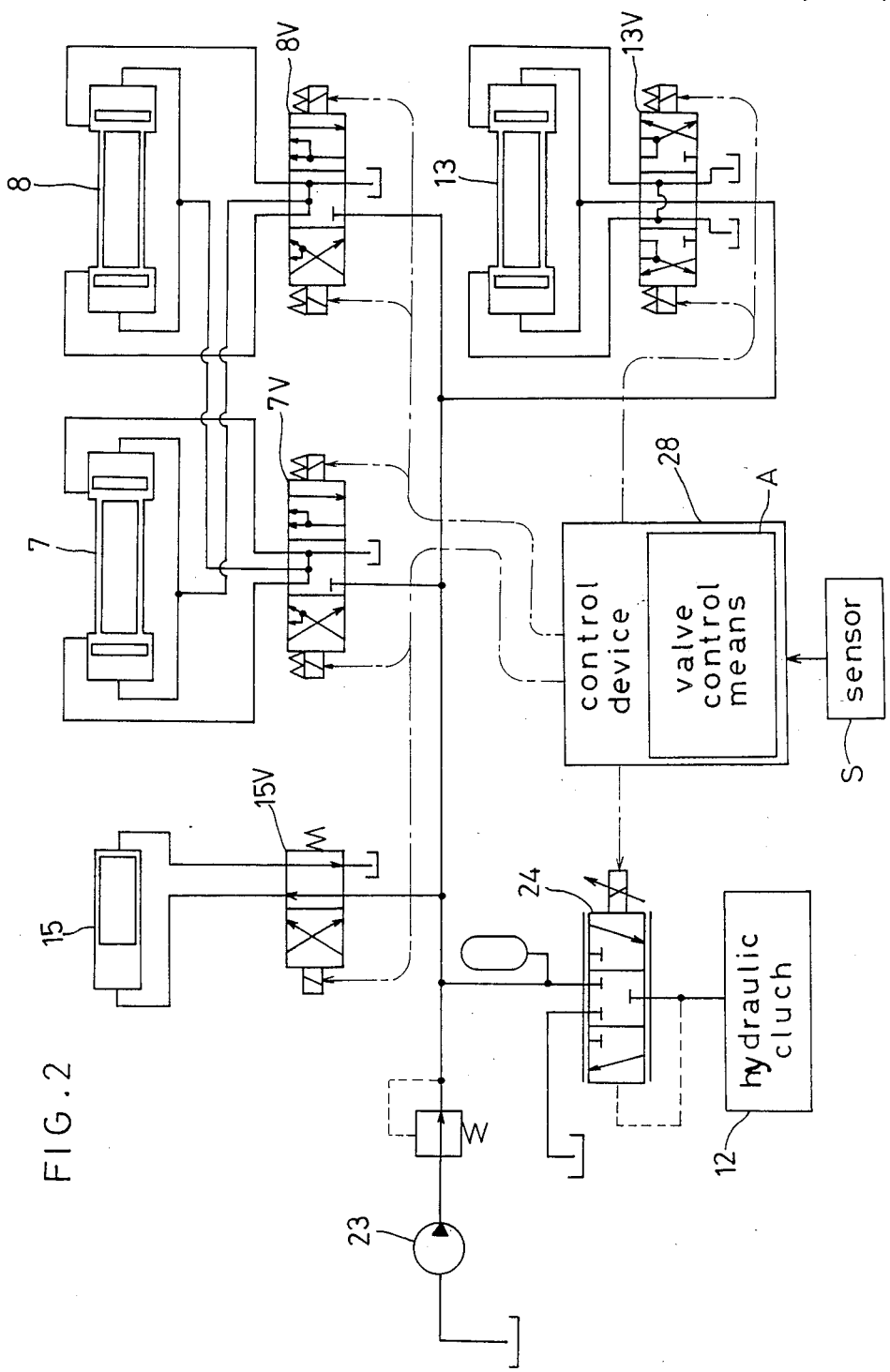
FIG. 2 is a diagram of a control system and a hydraulic system for the transmission system of FIG. 1.

FIGS. 1 and 2 show a transmission system and a change-speed control system for use in an agricultural tractor as one example of a work vehicle relating to the present invention.

In the transmission system of this embodiment, there are provided a transmission unit including an input shaft 3 for receiving power from an engine 1 via a main clutch 2, a further transmission unit for transmitting the power from the input shaft 3 to a PTO shaft 4 and a still further transmission unit for transmitting the power from the input shaft 3 to a vehicle driving unit. The transmission unit for the PTO shaft 4 includes a gear change-speed mechanism 5 for providing two speed steps by a manual operation and a transmission shaft 6 for transmitting the power from the mechanism 5 to the PTO shaft 4. The transmission unit for the vehicle driving unit includes, as accommodated in a transmission casing M, a main change-speed device 10 for transmitting the power from the input shaft 3 in four speed steps through an operation of a pair of shift cylinders 7 and 8, a hydraulic clutch 12 disposed between a first shaft 9 and a second shaft 11, a forward-reverse switchover device 14 for switching over the power from the second shaft 11 in two forward and reverse steps through an operation of a cylinder 13, an auxiliary change-speed device 17 for transmitting the power from the forward-reverse switchover device 14 to a third shaft 16 in two high and low steps and differential devices 18a for transmitting the power from the third shaft 16 to rear wheels 18. There are also provided a unit for taking off the power from the third shaft 16 via a gear transmission mechanism 19 to an output shaft 20 disposed at the bottom of the transmission casing M and a further unit for transmitting the power from the output shaft 20 via an intermediate shaft 21 to differential devices 22a for front wheels 22.

Further, the above-noted four shift cylinders 7, 8, 13 and 15, as shown in FIG. 2, are controlled independently of each other by means of respective electromagnetic valves 7V, 8V, 13V and 15V which are fed with pressure oil supplied as branched from a hydraulic pump 23. Also, the hydraulic clutch 12 is controlled by means of pressure oil from the hydraulic pump 23 through a control valve 24 constituted by an electromagnetic proportional reduction valve.

As shown in FIG. 3, the third shaft 16 mounts thereon a torque sensor S including amorphous films 25. . ., an exciting coil 26 and detection coils 27, 27. In this agricultural tractor, as a change-speed operation is automatically effected based on a detection result of the torque sensor S and an operation of the hydraulic clutch 12 for the change-speed is also effected based on the detection result of the torque sensor S, the change-speed operation may be carried out speedily and smoothly.

Figure 4A:
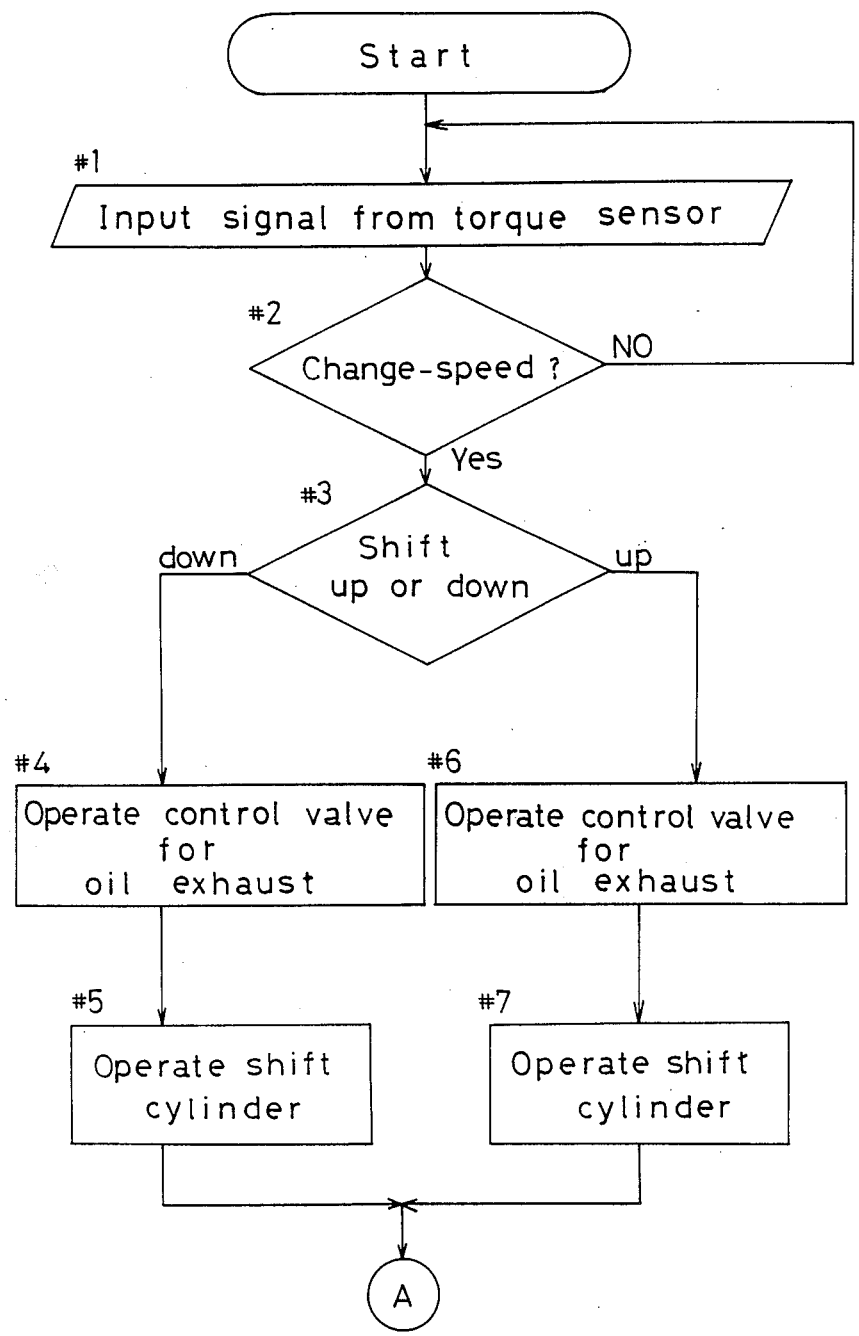
FIGS. 4a and 4b are a flow chart illustrating operations executed by a control unit.
Figure 4B:
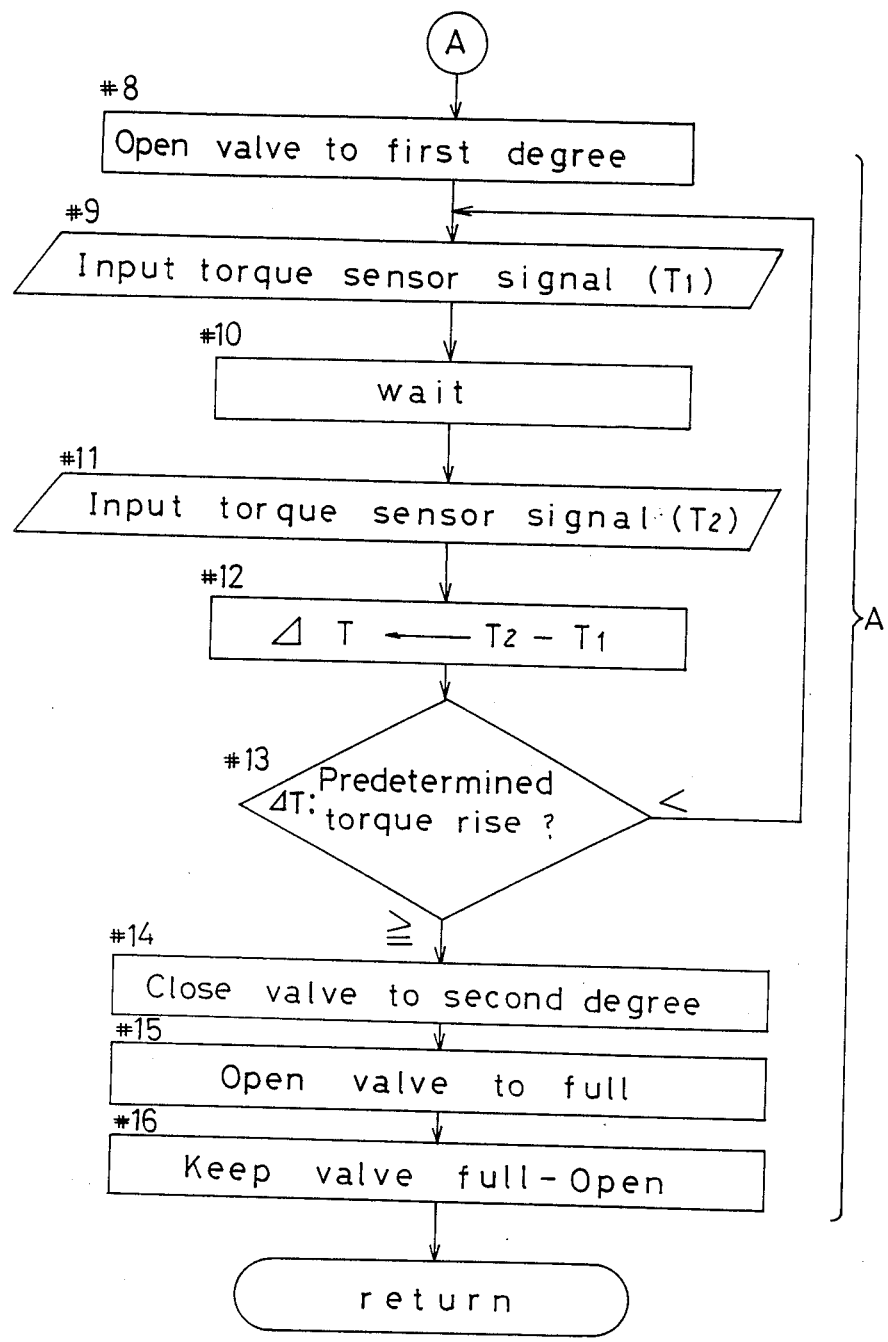

More specifically, the above four magnetic valves 7V, 8V, 13V, 15V and the control valve 24 are respectively controlled by signals from a control device 28. This control device 28 includes an unillustrated microprocessor and operates in accordance with a flow chart shown in FIGS. 4a and 4b. The operations of this device will be particularly described next.

For an automatic change-speed operation; first, a signal from the torque sensor S is inputted (step #1). Then, based on a value of this inputted signal, it is judged whether a change-speed operation is necessary or not (steps #2 and #3).

Incidentally, this judgement is made such that a shift-down operation is effected in the case of an excessive load with a rise in the torque value relative to a predetermined range whereas a shift-up operation is effected in case the torque value has decreased below the predetermined range.

Also, when it is judged that a change-speed operation is necessary, whether the needed operation is a shift-down operation or a shift-up operation, a predetermined shift cylinder operation is carried out with the hydraulic clutch 12 being kept disengaged (steps #4, #5, #6 and #7). Immediately after this operation, a valve control scheme is initiated. In its first control step, the work oil is fed to the hydraulic clutch 12 as the control valve 24 is opened to a predetermined value so that the hydraulic clutch 12 may quickly reach its half-clutched state (step #8).

Next, a signal T1 from the torque sensor S is inputted (step #9). After a lapse of a predetermined time period (step #10), a further signal T2 is inputted from the torque sensor S (step #11). Then, from a difference between the respective signals T1 and T2, it is judged whether the torque value has risen or not (steps #12 and #13).

Then, if a predetermined rise has been detected in the torque value, as a second step of the valve control scheme, the control valve 24 is temporarily closed to a predetermined value (step #14); then, the hydraulic clutch 12 is gradually opened according to a predetermined characteristics pattern (step #15). Thereafter, at a third step of the control scheme, this full engagement clutch condition is effectively maintained (step #16). Accordingly, the clutch becomes fully engaged smoothly without operational shocks.

Figure 5:
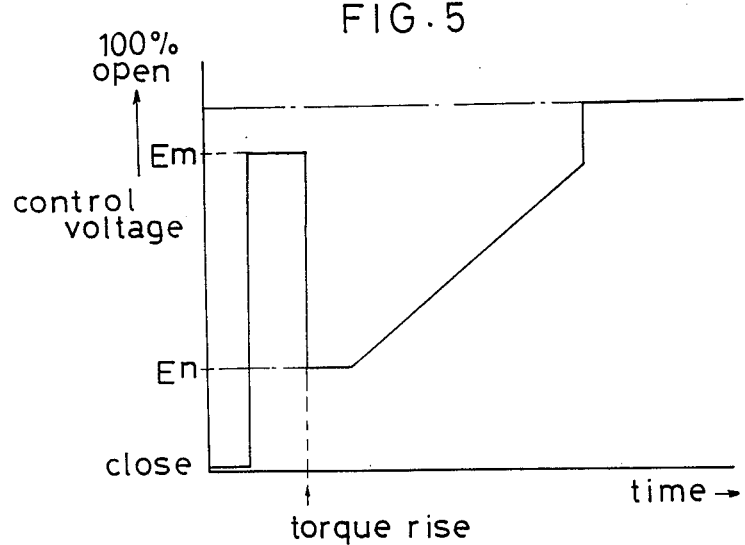
FIG. 5 is a graph showing a signal voltage to be applied to a control valve.

Incidentally, the control valve is opened to various degrees in accordance with a value of electric voltage supplied thereto. FIG. 5 graphically illustrates the operations executed at steps #8 through #15 in terms of the supplied electric voltage values and the time lapses. Alternately, this control operation may be carried out based on an electric current as well. It is to be noted here that the voltage value for providing the first predetermined valve opening degree achieved in the first step is set lower than the voltage value corresponding to the full-open valve condition maintained in the third step. This arrangement, as described hereinbefore, is for stabilizing the oil pressure condition inside the clutch casing in the initial stage of the second step.

Figure 6:
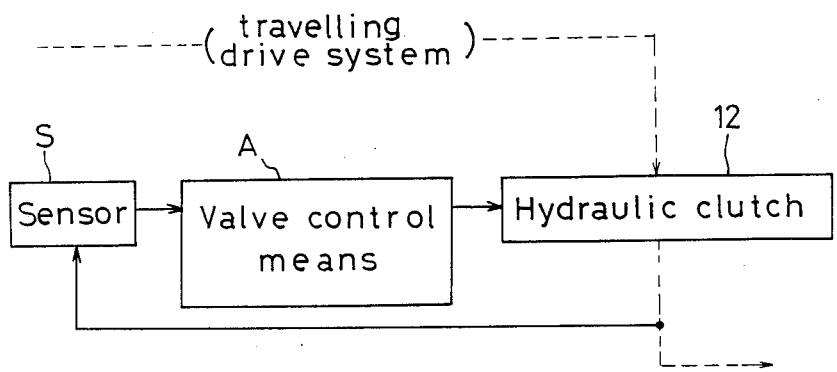
FIG. 6 is a diagram of the control system.

Also, the basic construction of the present invention is illustrated in FIG. 6, and valve control means A comprises the steps #8 through #15 in the flow chart.

Further, in the torque sensor S, the amorphous films 25 . . . are attached on the third shaft 16 with predetermined orientations and an alternate current bias is impressed on the exciting coil 26. Also, the detection coils 27 and 27 are arranged in a differential winding construction. Accordingly, a magnetic bias developing on the amorphous films 25 . . . resulting from a torsion of the third shaft 16 is detected by the detection coils 27 and 27 and the bias is then rectified through a synchronous rectifier 29 and amplified through an amplifier 30 so as to be outputted as a voltage signal.

Next, alternate embodiments of the present invention will be described with reference now to FIGS. 7 through 9a and 9b.

Figure 7:
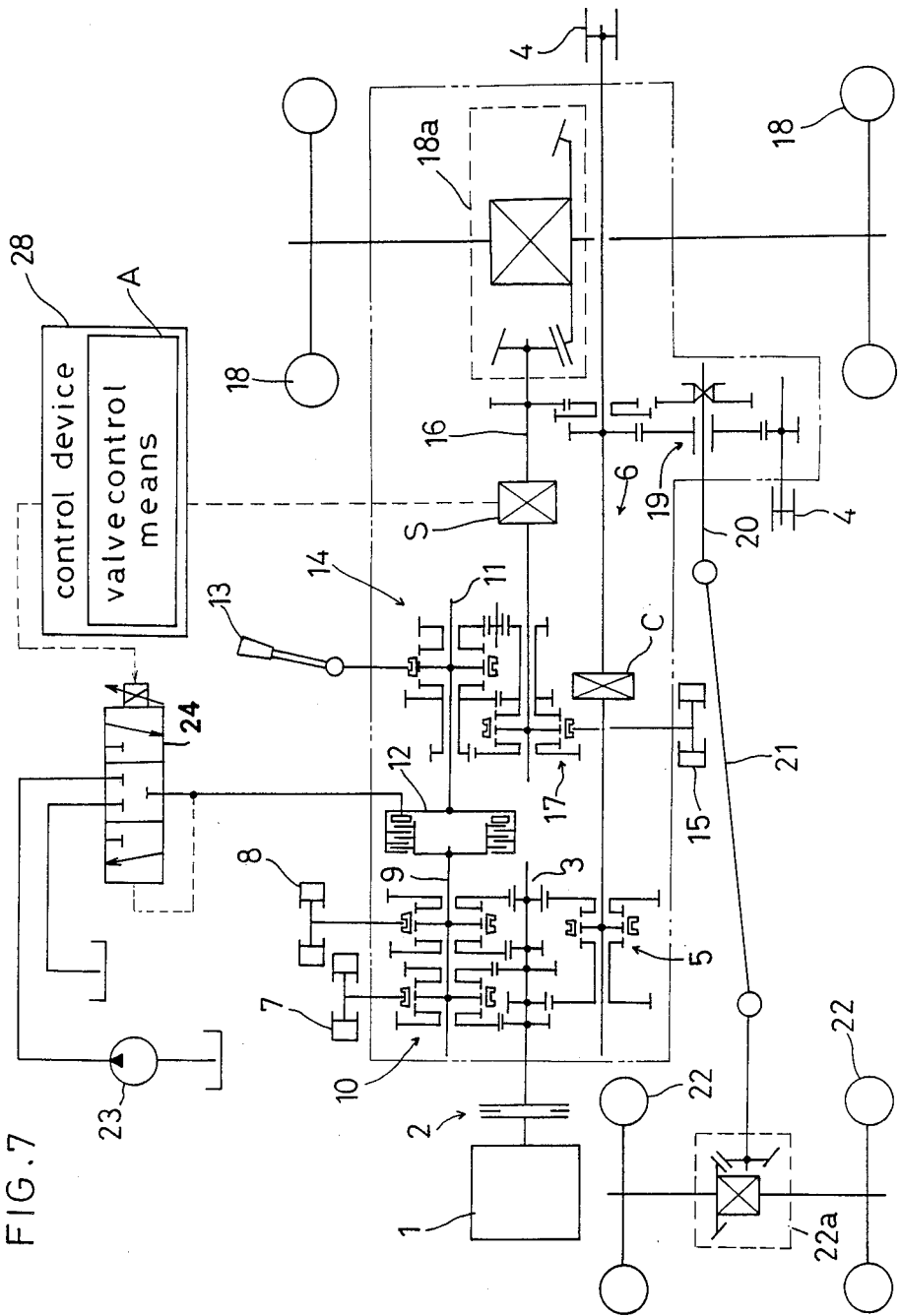
FIG. 7 is a schematic of a transmission system and a control system relating to an alternate embodiment of the invention.
Figure 8A:
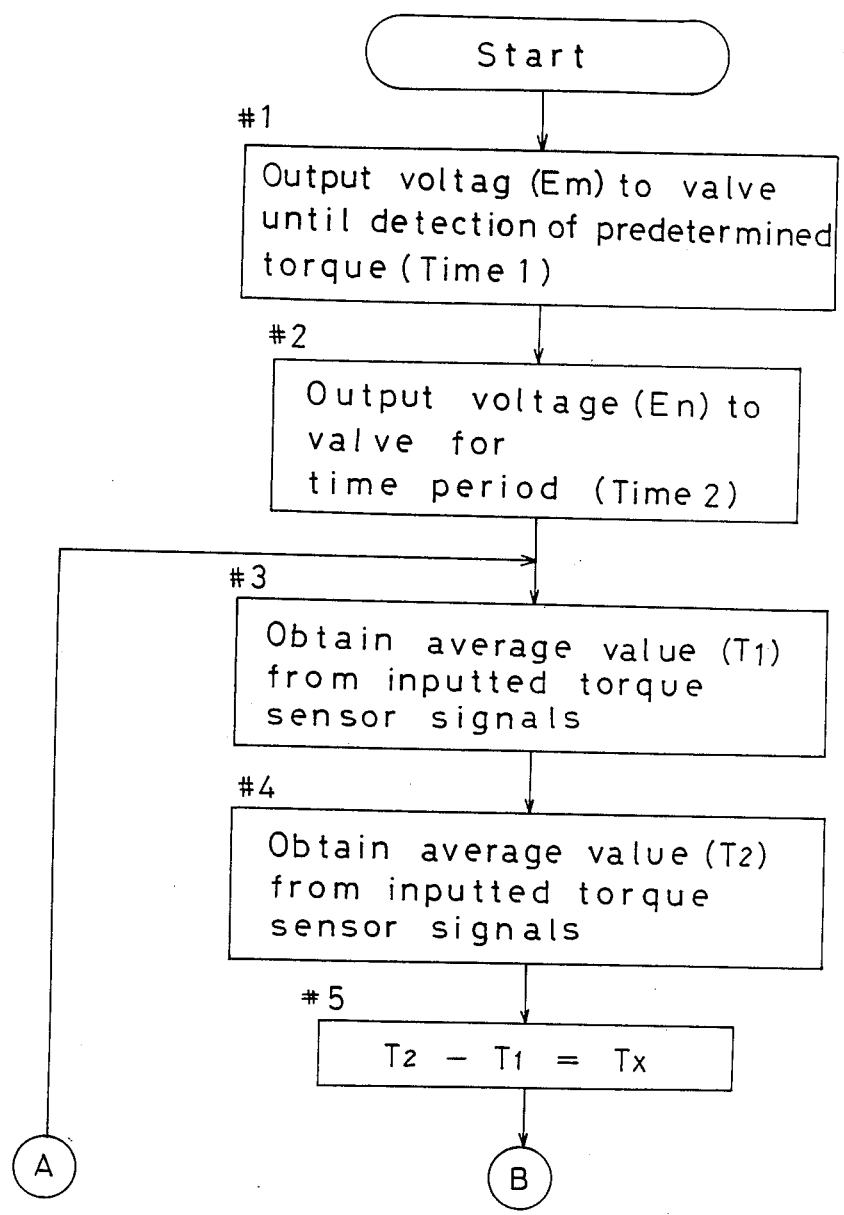
FIGS. 8a and 8b are a flow chart illustrating operations executed by a control unit relating to the alternate embodiment.
Figure 8B:
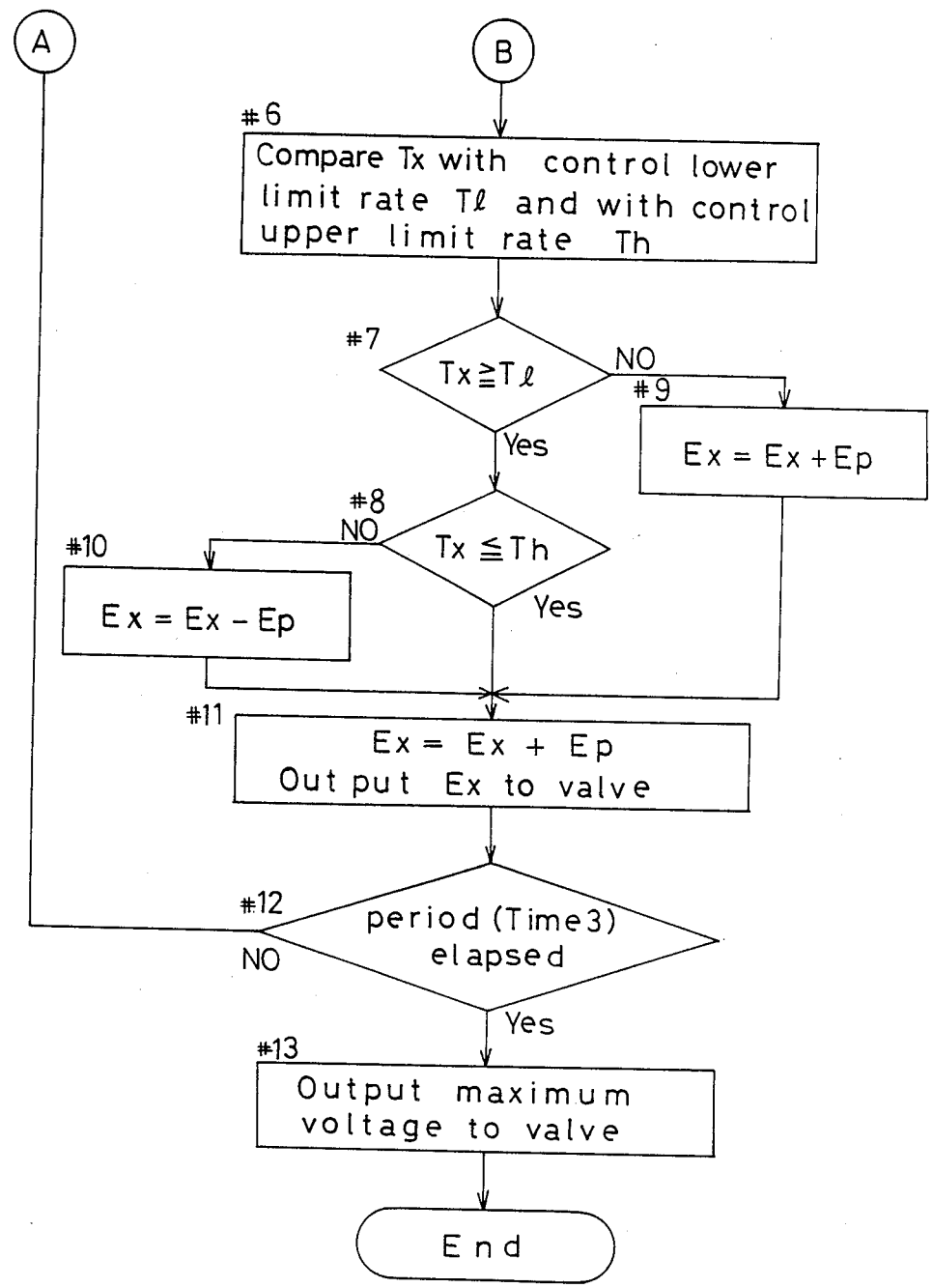
Figure 9:
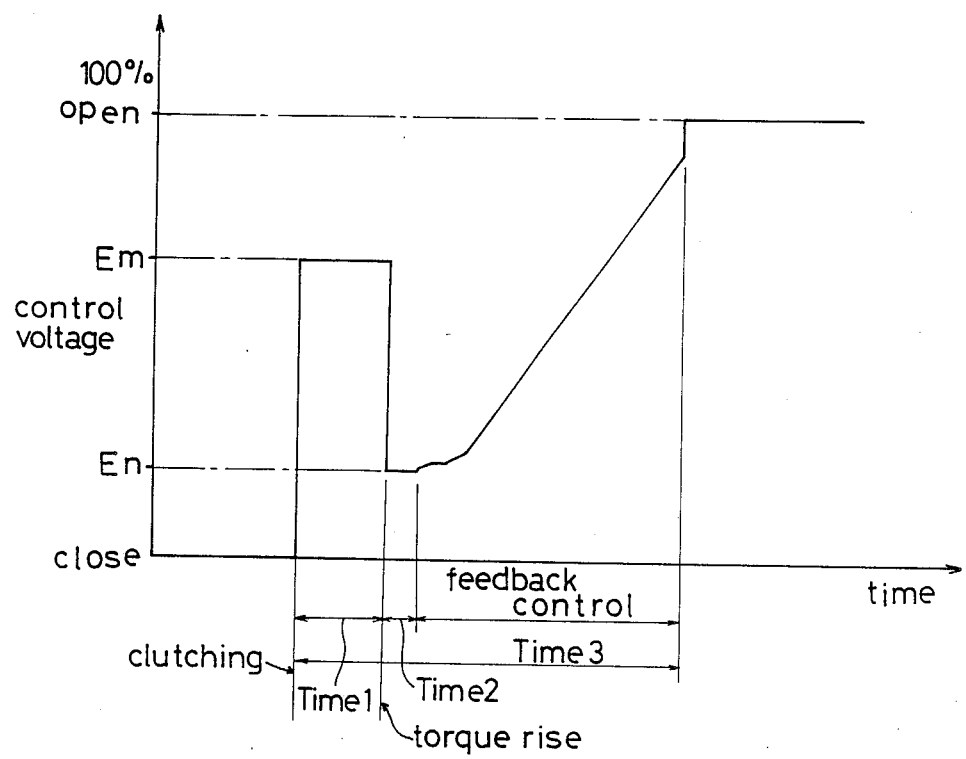
Figure 9:
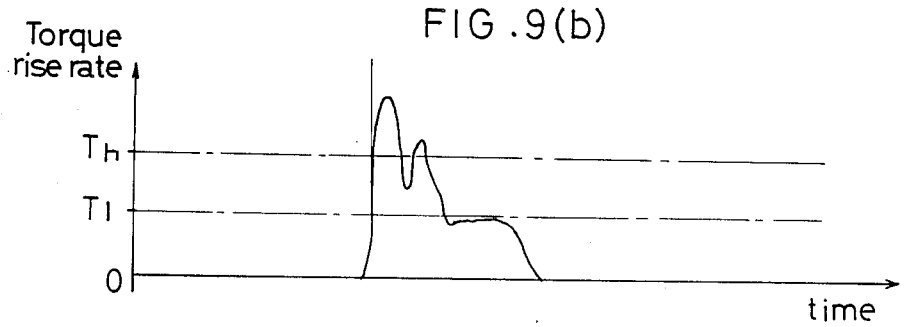

FIG. 7 shows a transmission system of an agricultural tractor and a control system for the hydraulic clutch 12 similar to those in the previous embodiment. However, in this embodiment, a control device 28 is designed solely for the hydraulic clutch 12 while other control devices such as the shift cylinders are adapted to be operated manually.

More particularly, the transmission system comprises a system for transmitting power from an engine 1 via a main clutch 2 to a travelling system and a further system for transmitting the power to a PTO system.

The PTO system includes a gear change-speed mechanism 5 for effecting a change speed operation in two high and low steps, a transmission shaft 6, a one-way clutch C attached on the transmission shaft 6 and a PTO shaft 4 for taking off power from the transmission shaft 6. On the other hand, the travelling system includes a gear type main change-speed mechanism 10 for effecting a change speed operation in four steps by means of two hydraulic actuators 7 and 8, a hydraulic clutch 12 receiving the power from the main change-speed mechanism 10, a forward-reverse change-speed mechanism 14 for switching over the power from the hydraulic clutch 12 into a forward or reverse direction by a manual operation, a gear type auxiliary change-speed mechanism 17 for effecting a change speed operation on the power from the forward-reverse change-speed mechanism 14 in high and low two steps by means of a hydraulic actuator 15, rear wheels 18 receiving the power from the auxiliary change-speed mechanism 17 via an output shaft 16 and differential devices 18a and front wheels 22 receiving the power from the auxiliary change-speed mechanism 19 via an intermediate shaft 21 and differential devices 22a. Further, there is provided an unillustrated control system such that the hydraulic clutch 12 is disengaged immediately before a change-speed operation of the travelling change-speed system takes place and the clutch 12 is engaged upon completion of the change-speed operation of the travelling change-speed system. Accordingly, there is provided a change-speed system which may be readily operated for a change-speed operation without disengaging the main clutch 2.

Moreover, for the hydraulic clutch 12, there is provided a system for feeding pressure oil from a hydraulic pump 23 through an electromagnetic proportional reduction type control valve 24. This control valve 24 is activated for clutch engagement by a signal from a control device 28 (an example of control means A) operated based on a feedback signal from a torque sensor S attached on the output shaft 16.

More particularly, the control valve 24 is opened by an increasing amount in association with a rise in a voltage signal. On the other hand, the control device 28 outputs a control signal to the control valve 24 in accordance with a flow chart of FIGS. 8a and 8b so as to restrict operational shocks in the course of the engaging operation of the hydraulic clutch 12. The operations of the control device will be described next.

When the control operation for engaging the hydraulic clutch 12 is initiated, as shown in FIG. 9a, as a first step of valve control scheme, until the torque sensor S detects a predetermined value of torque (Time 1), a control voltage Em is outputted for providing a first predetermined opening degree of the control valve 24. This operation is effected for the purpose of quickly bringing the friction plates of the clutch 12 into mutual contact condition. In succession, as a second step of the valve control scheme, the control signal En is outputted for a predetermined time period (Time 2) for providing a second predetermined opening degree of the control valve 24 (steps #1 and #2). Next, signals from the torque sensor S are inputted two times with a certain time interval therebetween (steps #3 and #4). This torque data input operation is for obtaining average torque values T1 and T2 in the respective time periods so as to offset errors tending to occur in the detection values. Then, based on a difference between the above average torque values T1 and T2, a torque rise rate Tx in the travelling system is obtained (step #5).

Also, for causing the torque acting on the travelling transmission system to rise by a predetermined rate, control reference values are so predetermined as illustrated in FIG. 9b. As shown, as these reference torque rise rates, a control lower limit rise rate T1 and a control upper limit rise rate Th are determined and also these values T1 and Th are compared with the transmission torque rise rate Tx obtained at step #5 (steps #7 and #8).

If it is judged that $Tx<T1$, a set voltage Ep is added to the control voltage Ex being currently outputted to the control valve 24 and this sum value is set as a new control voltage Ex (step #9). On the other hand, if it is judged that $Tx>Th$, the set voltage Ep is subtracted from the control voltage Ex being currently outputted to the control valve 24 and this difference value is set as a new control voltage Ex (step #10). Further, if it is judged that $Th \geq Tx \geq T1$, a new control voltage Ex is obtained by adding the set voltage Ep to the present control voltage Ex being currently outputted to the control valve 24 thereby setting the torque value to the rise tendency. Or, the set voltage Ep is added also to the respective control voltages Ex and Ex obtained at steps #9 and #10 thereby obtaining a new control voltage Ex. Then, this new control voltage Ex obtained through the above processes is outputted to the control valve 24 (step #11).

This control operation is carried out until a lapse of predetermined time period (Time 3) (step #12). Then, after the lapse of this time period (Time 3), as a third step of the valve control scheme, a maximum control voltage is outputted to the control valve 24 so as to maintain the same at its fully opened state.

Incidentally, as shown in the graph of FIG. 9b, with input of signals from the torque sensor S, the voltage signal to be outputted to the control valve 24 varies as illustrated in the graph. Also, in this embodiment, the entire steps illustrated in the flow chart of FIGS. 8a and 8b comprise the valve control means. In this embodiment also, the control valve 24 may be controlled by a variable control current instead of the control voltage.

In addition to the above-described embodiments, the transmission toque sensor may be attached on the transmission shaft disposed upstream in the power train relative to the hydraulic clutch or on the further transmission shaft for transmitting the power to the PTO shaft.

Also, the hydraulic clutch may be utilized for the so-called hydraulic clutch change-speed system where a gear change-speed ratio is selectively changed through switching over of the transmission route effected by an engagement or a disengagement of the clutch.

Moreover, the control means may comprise a combination of elements such as logic gates and comparators. Also, the control valve may be conveniently varied as selected from the rotary type, spool type, or the like. Lastly, the present invention may be applied to a combine or a planting machine as other examples of work vehicle.

What is claimed is:

1. A work vehicle comprising:
   a hydraulic clutch;
   a torque sensor (S) for detecting an amount of transmission torque of a transmission system of a moving vehicle;
   a control valve for adjusting an amount of work oil to be fed to said hydraulic clutch;
   valve control means (A) for controlling operations of said control valve in accordance with a predetermined control scheme designed for engaging said hydraulic clutch, said control scheme including,
   a first step of opening said control valve to a first predetermined degree,
   a second step of temporarily closing said control valve to a second predetermined degree lower than said first predetermined degree and then re-opening the same again up to a full-open degree, and
   a third step of maintaining the full-open condition of said control valve achieved by said second step;
   wherein said second step is inititated when said torque sensor (S) has detected a rise in the transmission torque.

2. A work vehicle as claimed in claim 1, wherein said hydraulic clutch is disengaged when gear change-speed mechanisms are activated for a change-speed operation while said clutch is engaged when said gear change-speed mechanisms become ready for power transmission.

3. A work vehicle as claimed in claim 2, wherein said hydraulic clutch is disposed between the main change-speed device and a forward-reverse switchover device for transmitting power from said main change-speed device to an auxiliary change-speed device.

4. A work vehicle as claimed in claim 1, wherein the change-speed operation of said vehicle is effected automatically based on a detection result of transmission torque of the moving vehicle, with said torque sensor (S) acting also as a transmission torque detecting mechanism utilized for said automatic change-speed operation.

5. A work vehicle as claimed in claim 1, wherein said torque sensor (S) detects a magnetic bias developed in at least a pair of amorphous films affixed on a transmission shaft of the transmission system.

6. A work vehicle as claimed in claim 1, wherein said torque sensor (S) is attached to a PTO shaft of the work vehicle.

7. A work vehicle as claimed in claim 1, wherein said torque sensor (S) is disposed downstream in the power transmission train relative to said hydraulic clutch.

8. A work vehicle as claimed in claim 1, wherein said re-opening operation of the control valve by said second step is executed in accordance with predetermined characteristics.

9. A work vehicle as claimed in claim 1, wherein said re-opening operation of the control valve by said second step is executed based on a detection by said torque sensor (S) so as to permit a transmission torque value of the transmission system to follow a predetermined rising tendency.

10. A work vehicle as claimed in claim 9, wherein in said re-opening operation of the control valve by said second step, a control lower limit value (T1) and a control upper limit value (Th) are preliminarily set for restricting a torque rise developing in the transmission system, with said re-opening control operation being effected by comparing said upper and lower limit values (T1 and Th) respectively with a transmission torque rise rate (Tx) obtained after a predetermined time period.

11. A work vehicle as claimed in claim 10, wherein said control valve is opened or closed to said various predetermined degrees by controlling a control voltage Ex to be inputted to the valve 24.

12. A work vehicle as claimed in claim 11, wherein in said re-opening operation of the control valve by said second step, said control voltage (Ex) is maintained at the same value if said torque rise rate (Tx) is higher than said control upper limit value (Th), said control voltage (Ex) is added with a set voltage (Ep) if said torque rise rate (Tx) is lower than or equal to said control upper limit value (Th) and is greater than or equal to said control lower limit value (T1), and said control voltage (Ex) is added with a double of said set voltage (Ep) if said torque rise rate (Tx) is lower than said control lower limit value (T1).

13. A work vehicle as claimed in claim 1, wherein said first predetermined valve opening degree of said first step is lower than the full-open degree maintained by said third step.

* * * * *